(12) United States Patent
Mayer-Lindenberg

(10) Patent No.: US 6,385,717 B1
(45) Date of Patent: May 7, 2002

(54) PROGRAMMABLE 1-BIT DATA PROCESSING ARRANGEMENT

(75) Inventor: Georg-Friedrich Mayer-Lindenberg, Hamburg (DE)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/375,948

(22) Filed: Aug. 17, 1999

(30) Foreign Application Priority Data

Aug. 17, 1998 (DE) .......................................... 198 37 101

(51) Int. Cl.[7] .............................................. G06F 9/308
(52) U.S. Cl. .......................... 712/225; 712/14; 711/109
(58) Field of Search ........................ 708/209; 711/109, 711/110; 712/10, 14, 200, 225

(56) References Cited

U.S. PATENT DOCUMENTS

| | | | | |
|---|---|---|---|---|
| 4,615,015 A | * | 9/1986 | Olander, Jr. et al. | 708/130 |
| 4,799,149 A | * | 1/1989 | Wolf | 711/108 |
| 5,287,532 A | * | 2/1994 | Hunt | 712/10 |
| 5,450,604 A | * | 9/1995 | Davies | 712/22 |
| 5,471,628 A | * | 11/1995 | Phillips et al. | 712/223 |
| 5,704,052 A | * | 12/1997 | Wu et al. | 712/204 |
| 6,005,903 A | * | 12/1999 | Mendelovicz | 375/367 |

FOREIGN PATENT DOCUMENTS

| | | |
|---|---|---|
| DE | 3824306 | 1/1990 |
| EP | 0428326 A1 | 11/1990 |
| GB | 1448041 | 5/1974 |

* cited by examiner

Primary Examiner—William M. Treat
(74) Attorney, Agent, or Firm—Theo Mak

(57) ABSTRACT

A variety of applications do not require a high data throughput. The standardization of the interface in the field of smart cards fixes the processing width at 1 bit. Therefore, it is effective to use a programmable structure which operates with a data width of one bit. A data processing arrangement in the form of a 1-chip implementation with a processing width of 1 bit can be used in chip cards for simple control and automation functions while utilizing serial protocols. This structure features uncomplicated circuitry, a small chip surface area, a wide field of application and a low power consumption. The programmable data processing arrangement includes an ALU (10), which is based on a 1-bit processing structure, and a data memory (50) which is realized as an end-around shift register (52) having a word width of 1 bit; data can be serially applied to the ALU (10) from data outputs by unidirectional shift operations and the ALU (10) can apply data serially, via a common data input, to the shift register (52) which can be partitioned; a partition thereof, once activated by selection, remains active until an instruction activates another partition, and data can be applied to the ALU (10) from the data output ($SO_a$) at the end of the partition and data can be applied from the ALU to the data input ($SI_a$) of the partition at the beginning of the partition.

20 Claims, 2 Drawing Sheets

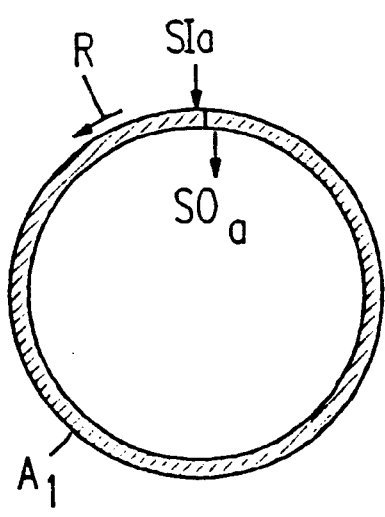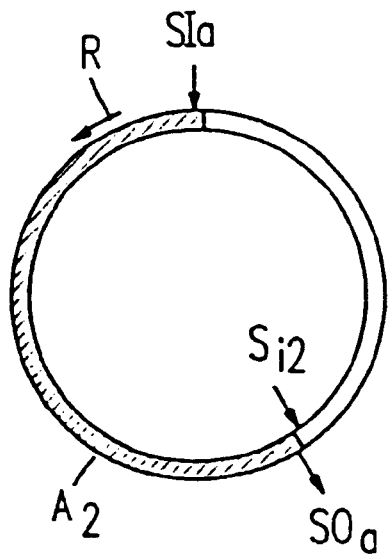
Fig.2A　　Fig.2B
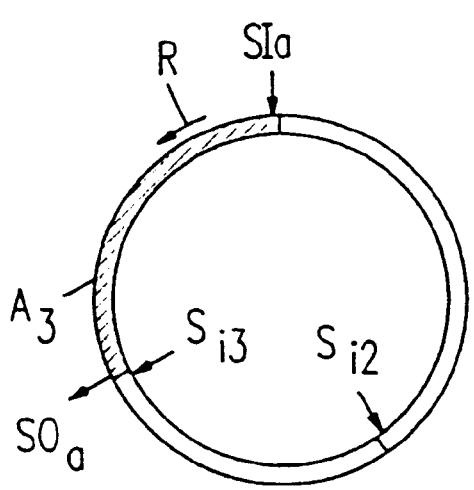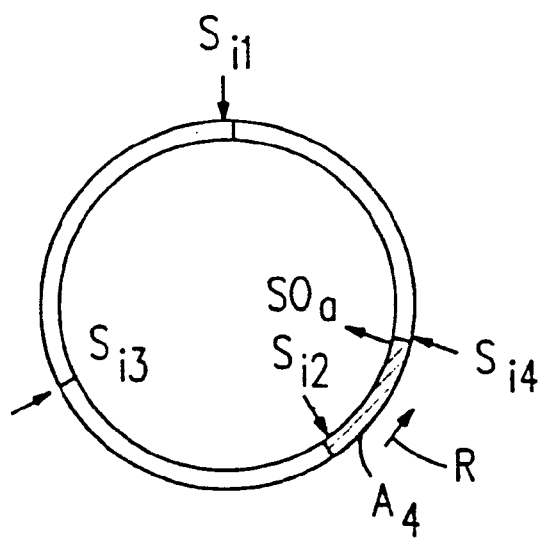
Fig.2C　　Fig.2D

PROGRAMMABLE 1-BIT DATA PROCESSING ARRANGEMENT

The invention relates to a programmable 1-bit data processing arrangement which includes an ALU which is based on a 1-bit processing structure and a data memory which is realized as an end-around shift register having a word width of 1 bit, wherein data can be serially applied from data outputs to the ALU via unidirectional shift operations and the ALU applies data serially to the data memory via a common data input, and also relates to the problem of implementing simple, programmable logic which imposes only moderate requirements as regards data processing width and speed and in which a minimum number of gates is achieved by minimizing the requirements imposed on a universally programmable structure.

One-chip implementations which have a processing width of 1 bit are known. However, they utilize structures which internally have a structure for greater processing widths.

DE 38 24 306 A1 describes an arithmetic unit in which the data bus has a width of at least but preferably 1 bit and in which instructions and data are serially transported, via shift registers, between the data memory and the internal data bus of the microprocessor, so that the length of the individual data strings differs. The length of the data string to be transferred is indicated via a second line. The registers and also the arithmetic unit in this structure are designed for a multiple of the data bus width. The storage of the data then takes place in a RAM as in more complex structures. Mapping the data on a width of 1 bit is performed only for the data transfer between the RAM and the internal data bus of the processor; in this a shift register is used for the transfer.

GB 1 448 041 describes a 1-bit digital computer. The data is applied to the ALU via data buses having a width of 1 bit. The input data is applied to a register in parallel and the output data is output in parallel by an output register. The decoder accesses these registers via addresses and conducts the data sequentially to the RAM or to a working register connected to the ALU. A stack with four positions is used as the working register which is realized as a bi-directional shift register. In this case a simple sequencer is used which cyclically reads a fixed instruction sequence. In addition to the working register, this processor utilizes a RAM for storing intermediate results.

EP 0 428 326 A1 discloses a processor array system in which each ALU receives data from the data memory via a multiplexer and outputs data to the data memory via a multiplexer. Each individual ALU of this array system includes an accumulator register and a carry register which prepare data for the ALU. The input to the ALU from the accumulator register is multiplexed with an input from a shift register. This unidirectional shift register has a fixed length of 32 bits. It includes four data outputs which are all spaced 8 bits apart. One of these four inputs is selected and connected to the ALU via the multiplexer. The least significant bit of the shift register is linked to its most significant bit. In the case of bit-wise shift operations, each time one bit of this shift register is used as an operand for the ALU. In the case of multiplications the shift register supplies the operands and at the same time receives the multiplication result on the common data input.

For many applications it is not necessary to offer a large processing width, because the arriving data need not be processed very quickly or, because, due to the external process, so few data arrives that it can be serially processed also in the case of full functionality. Until now either over-sized chip structures with a higher power rating were used for these applications or recourse was taken to wired logic which, however, cannot be programmed.

In the field of smart cards however, there is a range of applications where the data throughput is not very high. Moreover, the width of the interface to the environment is fixed at 1 bit by the standardization of the contact interface ISO 7816-3.

SUMMARY OF THE INVENTION

Therefore, it is an object of the invention to provide a programmable structure which operates with a processing width of 1 bit, occupies an as small as possible surface area and satisfies simple requirements such as communication and processing of data.

This object is achieved according to the invention in that the shift register can be partitioned, that, once selected by a selection instruction, an active partition remains active until a further selection instruction activates another partition, and that data can be applied to the ALU from the data output at the end of the partition and data can be applied from the ALU to the data input of the partition at the beginning of the partition.

For the programmable structure with a processing width of 1 bit the invention utilizes the fact that for smart cards and identification systems the communication interface is standardized in conformity with ISO7816-3 which specifies the 1-bit data width and that, using a reduced instruction set, there is obtained a universally programmable, operational structure which requires a minimum chip surface area only.

The end-around shift register can be partitioned into partitions by way of select instructions or fixed presets; the lengths of the partitions may then be different.

This structure is optimized in that use is made of only two 1-bit working registers which are connected in series, the value of the second working register containing the previous value of the first working register. Generally speaking, the ALU supplies the first working register with values other than those applied to the shift register. Commonly used instructions consist of 1-bit sequences. Because the ALU simultaneously outputs different values to its working register and to the shift register, a higher calculation capability is achieved while using as few means as possible. Moreover, the selected partition can be closed so as to form a ring, via the ALU, so that its contents are restored again after complete reading out and shifting through.

The data of the variables stored in the relevant partition is serially applied to the ALU via the data output at the partition end. Results of completed arithmetic operations are serially applied, in the same shift operation, to the data input at the beginning of the relevant active partition.

An end-around shift register is used to generate the addresses for the program memory instead of a complex address counter. As a result, the address sequences are not linear and the next address is generated by means of the previous address.

Call structures are dispensed with; this must be taken into account for the programming of this structure. Several registers otherwise required can thus be dispensed with, so that a simple structure is obtained not only for the ALU but also for the control system. However, only conditional jumps can be programmed; in given circumstances individual program sequences are then possibly completed several times.

The entire system can be adapted to relevant applications by extensions or also by reduction of components, the processing width of 1 bit nevertheless being maintained. When the partitioning is permanently adjusted, the partitioning logic can be dispensed with. A further set of instructions can be prepared by extension of the program memory.

The power consumption can be further reduced when this structure operates with asynchronous logic.

The following sub-objects, required for the use of such systems, are achieved by means of this system.
comparison with n-bit constant,
addition of constants to variables,
negation of the bits of a byte,
copying of a single bit from a bit sequence,
setting of a single bit from the bit sequence to a corresponding value,
storing of individual bits and bit sequences,
shift register of variable length for encoding algorithm,
serial input and output of one or more bits,
conditional jumps,
addition and subtraction of bit sequences,
logic function with each time 2 bits.

The set of instructions of the design used represents a processor instruction set which includes 16 ALU instructions and utilizes only two working registers. Consequently, complex algorithms can also be executed by means of this simple but efficient arithmetic unit.

The advantage of this structure resides in the drastically reduced chip surface area, so that, in addition to the required space and materials, the power consumption is also reduced. The described requirements enable implementation of a plurality of applications which do not impose severe requirements as regards data width and processing speed. Because of its moderate surface area requirements, this universally programmable structure can be simply integrated in circuits, without an additional chip being required.

BRIEF DESCRIPTION OF THE DRAWINGS

Embodiments of the invention will be described in detail hereinafter with reference to the following figures. Therein:

FIG. 2 shows the construction of the end-around data memory.

DETAILED DESCRIPTION OF THE PRFERRED EMBODIMENT

Figure 1:
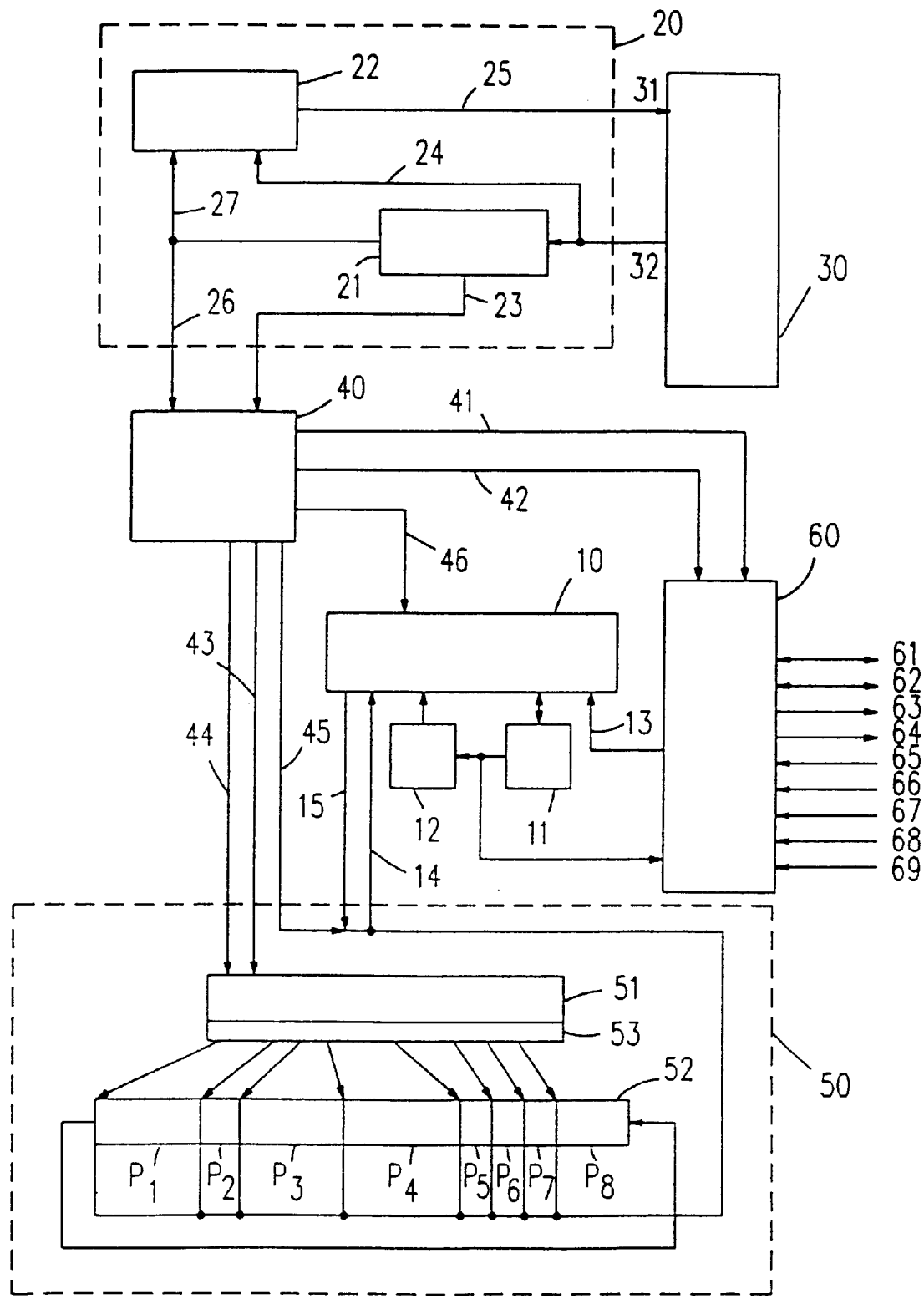
FIG. 1 is a detailed representation of the programmable structure.

FIG. 1 is a detailed representation of the universally programmable structure. The structure includes: an ALU 10 with two 1-bit working registers 11 and 12, a control unit 20 with a program counter 22 and an instruction register 21, a program memory 30, a serial data memory 50 with partitioning logic 53, a selection register 51 and a shift register 52, an input/output unit 60 and a decoder 40.

Logic operations are executed in the ALU 10 while using the two 1-bit working registers 11 and 12 for the storage of 1-bit operands. Input signals for the ALU 10 are supplied by the working registers 11 and 12, the shift register output 14, the input port 13 and a constant 1 which is not shown in the drawing. Output signals of the ALU 10 are applied to the working register 11 or to the shift register input 15. The ALU 10 operates with an operand amounting to 1 bit and is capable of executing the basic logic functions AND, OR, NOT and EXOR, the individual input signals being combined accordingly. The ALU 10 utilizes the 1-bit working registers 11 and 12, each of which consists of a flip-flop; these two registers are connected in series. The working registers 11 and 12 contain one or two operands for the basic functions. A further operand can be read directly from the data memory 50. The ALU 10 applies the result of such functions to the working register 11 or, alternatively, to the data memory 50. The second working register 12 is not explicitly addressed as a working register; it contains each time the previous value from the working register 11. As a result, an additional address bit is avoided in the instruction code. The most important n-bit operations of the ALU are realized as 1-bit instruction sequences, the operand being loaded each time from the shift register 52 of the data memory 50 which is shifted at the same time. Generally speaking, the values applied to the working register 11 are not the same as those applied to the shift register 52.

The control unit 20 consists of the program counter 22 and the instruction register 21. The program counter 22 is constructed as an end-around shift register and generates the address for the next instruction in the program from the each time current address. The address sequence thus obtained is not linear. In the case of sequential accesses, the shift operation of the program counter 30 generates the respective next address. In the case of jump instructions, the first five bits of the previous instruction on the lead 27 and the 6 bits of the current instruction on the lead 24 serve as inputs for the program counter 22. On the basis thereof the program counter 22 generates the new address which then consists of 11 bits and is applied, via the lead 25, to the address input 31 of the program memory 30. Subsequently, the further instructions are read as from the address thus selected and are transferred to the instruction register 21 so as to be executed in the next cycle. The program memory 30 in the present embodiment has a storage capacity of 2 k, the word width being 6 bits. The bit sequence of the current instruction, consisting of 6 bits, is conducted to the decoder 40.

The decoder 40 serves to decode the instructions. It consists of a combinatory circuit which generates signals required to activate signal paths 41–46. The decoder receives input signals in the form of the 6 bits of the instruction register, via the lead 26, and possibly also the signal 23 for two-word instructions. Via the leads 41 and 42 the decoder 40 activates the individual external input or output conductors and the selection register 51 by means of the select signal 44 in order to read out variables stored in the data memory 50 so that they can be processed in the ALU 10. The state of the partition is transferred to the selection register 51 by means of the signal 43 which has a width of 8 bits. The operation to be executed by the ALU and derived from the instruction code in the decoder 40 is selected via the lead 46.

In addition to the shift register 52, the serial data memory 50 includes the selection register 51 which also contains the partitioning logic 53. The shift register 52 is in this case subdivided into 8 partitions $P_i$ and coupled end around. Because the data memory 50 requires only eight addresses for the eight partitions $P_1 \ldots P_8$, it can be addressed by means of 3 bits. The 8-bit selection register 51 contains the state of the corresponding partition boundaries. The boundary between two partitions $P_i$ is activated by a selection instruction. When a boundary between two partitions is passive, these two separate partitions behave as one partition. The partitioning is carried out by means of the first select instructions after a reset. The partitions of the shift register 52 then have a fixed length, but generally are of different length. The length of the partitions is chosen to be such that, for example short partitions are provided for given variables whereas longer partitions are used for encryption operations. A select instruction selects the current partition $P_i$ of the shift register 52 wherefrom, via a series of ALU instructions, data is shifted and applied, via the lead 14, to the ALU for processing. The processing results of the ALU 10 are applied, via the shift register input 15, to the active partition $P_i$ of the shift register again. The processing results of the ALU are present in parallel in the serial-in positions of al partitions, but this data is taken over only by the selected partition. As a result, the data is serially accessed and the processing thereof is also performed serially. The addressing of the data memory 50 is performed by a select instruction and precedes the ALU operation. Because usually the same partition is used for a plurality of successive ALU operations, the overhead remains proportionally small.

The following functions are realized in the input/output unit 60:

selection of one of four possible input ports 62, 65–67; the input port 0 is the port denoted by the reference 62 and the further input ports 1, 2 and 3 are the ports denoted by the references 65–67;

selection of one of four output ports 61–64; the output port 0 is the port denoted by the reference 61, the output port 1 is the port denoted by the reference 62, and the further output ports 3 and 4 are denoted by the references 63 and 64;

synchronization of the input port 62 with an external SCLK signal 61;

generation of the clock synchronized reset signal with the signal 68, generation of an internal clock signal CLK from an additional clock input PCLK 69.

The leads 61 and 62 can then be driven bi-directionally. Via the leads 41 and 42, activated by the decoder 40, one of four possible inputs 62, 65–67 is selected and applied to the ALU 10 via the lead 13. An interruption mechanism for the synchronization with external events is dispensed with. Instead, in the case of external events at least one input lead is synchronized with the clock signal. At one data input to one of these input leads the internal clock signal is suppressed until the next clock edge of the external clock signal commences. The SCLK lead supplies an external clock signal. When the SCLK input 61 does not carry a signal, the processor is stopped. The internal clock is generated from the PCLK clock 69. The output ports 61–64 output ALU results which are buffered in the working register 11.

The FIGS. 2A–D show the end-around shift register (50/FIG. 1). These Figures show the serial-in position (SI) and the serial-out position (SO). The variable to be processed, present in an appropriate partition, is selected and shifted out of the relevant partition of the shift register, without the other partitions of the shift register being shifted or modified. The data memory 50 operates with inherent addresses, i.e. the variable address is not indicated for each operation, but the variable to be processed is set once by the selection of the active partition and is then inherently valid until it is changed.

Data cannot be input into the data memory prior to the first selection instruction. The first selection instructions after a reset determine the partition boundaries and the corresponding serial-in positions and serial-out positions. The first selection instruction sub-divides the end-around shift register at a first serial-in position. The first partition is thus formed. Because a partition always extends from the serial-in position selected by the selection instruction to the next serial-in position and the ring thus far contains only one selected serial-in position, the first partition constitutes the complete shift register. As opposed to the non-partitioned shift register, however, in this case the input position (serial-in) and the output position (serial-out) of the partition are defined. This first serial-in position is stored, like all subsequent positions, in storage cells in the selection register. The serial-out and serial-in positions remain active until the next selection instruction. Via the next selection instruction a further serial-in position in the shift register is selected so as to be stored. The part of the shift register which is situated ahead of the serial-in position just selected, viewed in the direction opposing the shift direction R, constitutes the next partition. This partition extends from the serial-out position until the next serial-in position, viewed in the direction opposing the shift direction. The storage of the serial-in position at the same time defines the partition boundaries. Each subsequent selection instruction selects and activates a partition of the shift register; this partition then extends from the active serial-in position to the active serial-out position. The active serial-in position is the position situated nearest to and ahead of the active serial-out position, viewed in the direction opposing the shift direction R.

The selection instruction has two functions. The first selection instruction after a reset carries out the partitioning. After the partitioning, the selected partitions are activated by means of the selection instruction.

The FIGS. 2A–2D show each time the active partition An and the active serial-in ($SI_a$) and serial-out positions ($SO_a$). The positions denoted by the reference $S_{in}$ represent the stored serial-in positions of the partitions.

FIG. 2A shows the shift register after the first selection instruction; in this case the complete shift register was selected as the active partition $A_1$. Via the active serial-out position $SO_a$ the data is shifted out of the shift register and via the active serial-in position $SI_a$ new data is shifted into the partition $A_1$ again.

FIG. 2B shows the shift register after a second selection instruction; in this case the activated partition $A_2$ is not as long as the partition $A_1$ in the first case. The second selection instruction defines the same active serial-in position $SI_a$ as in FIG. 2A, but the active serial-out position $SO_a$ is a different one. As a result, a second serial-in position $S_{i2}$ is defined which, as opposed to the serial-out positions, is stored until the next reset.

FIG. 2C shows a partition $A_3$ activated by a third selection instruction. It will be evident that the serial-in position $S_{i3}$ was stored adjacent $S_{i2}$.

FIG. 2D shows an activated partition $A_4$ which commences at the serial-in position $S_{i2}$ of the second selection instruction. After this activation, the position $S_{i4}$, being situated behind the active serial-out position $SO_a$, is stored. The individual bits, however, are shifted out of the activated partition $A_n$ in the counter-clockwise direction.

No call structures are implemented in this arrangement, so that a return stack and a link register can be dispensed with. Instruction sequences which are repeatedly executed are not called as a sub-routine, as is customary, and no return to the starting point takes place after the execution. Sub-routine calls, however, can be emulated by writing status information into a data register prior to the jump in the routine and by using this information, at the end of the routine, to carry out a branching operation behind the jump instruction. Conditional jumps can be carried out in dependence on the state of the working register 11. Two-word instructions, containing an absolute destination address, are used for these jumps. The first part of the address is buffered in the instruction register 21 and the signal 23 indicates a two-word instruction. The contents of the two working registers 11 and 12 are interchanged upon these jumps.

The program memory 30 is a ROM which contains 2 k×a width of 6 bits in the present embodiment. The width can be optionally increased to 7 bits. The capacity is dependent on the application. Extension of the word width to 7 bits enables a larger set of instructions and the address space is then also enlarged. With the increase of the word width the program memory can also be enlarged to 8 k, so that the required memory capacity, and hence the surface area required on the chip, can be adapted to the relevant application.

The data memory 50, being constructed as a shift register 52, can operate with permanently adjusted partitions, thus reducing the required partitioning logic. Additional registers are also feasible when use is made of instructions having a width of 7 bits.

What is claimed is:

1. A programmable data processing arrangement which includes an ALU (10) which is based on a 1-bit processing structure and a data memory (50) which is realized as an end-around shift register (52) having a word width of 1 bit, wherein data can be serially applied from data outputs to the ALU (10) via unidirectional shift operations and the ALU (10) applies data serially to the shift register via a common data input, characterized in that the shift register (52) can be partitioned, that an active partition, once selected by a selection instruction, remains active until a further selection instruction activates another partition, and that data can be applied to the ALU (10) from the data output ($SO_a$) at the end of the partition and data can be applied from the ALU to the data input ($SI_a$) of the partition at the beginning of the partition.

2. A programmable data processing arrangement as claimed in claim 1, characterized in that with the ALU (10) there are associated two series-connected 1-bit working registers (11) and (12), that the second working register (12) contains the previous value of the first working register (11), and that the ALU (10) supplies the first working register (11) and the shift register (52) with values independently of one another.

3. A programmable data processing arrangement as claimed in claim 1, characterized in that the shift register can be sub-divided into partitions ($P_i$) of different length by means of instructions.

4. A programmable data processing arrangement as claimed in claim 1, characterized in that a control unit (20) utilizes a program counter (22), constructed as an end-around shift register, in order to form the addresses of the instructions in the program memory (30) which generates the next address for the next instructions from the bit sequence of the current instruction.

5. A programmable data processing arrangement as claimed in claim 1, characterized in that only conditional jumps which are dependent exclusively on the state of the first 1-bit working register (11) can be performed, and that these jump instructions are realized as two-word instructions.

6. A programmable data processing arrangement as claimed in claim 1, characterized in that the overall arrangement is realized in asynchronous logic.

7. A data carrier with a data processing arrangement as claimed in claim 1.

8. A reading apparatus with a data processing arrangement as claimed in claim 1.

9. A programmable data processing arrangement as claimed in claim 2, characterized in that the overall arrangement is realized in asynchronous logic.

10. A programmable data processing arrangement as claimed in claim 3, characterized in that the overall arrangement is realized in asynchronous logic.

11. A programmable data processing arrangement as claimed in claim 4, characterized in that the overall arrangement is realized in asynchronous logic.

12. A programmable data processing arrangement as claimed in claim 5, characterized in that the overall arrangement is realized in asynchronous logic.

13. A data carrier with a data processing arrangement as claimed in claim 2.

14. A data carrier with a data processing arrangement as claimed in claim 3.

15. A data carrier with a data processing arrangement as claimed in claim 4.

16. A data carrier with a data processing arrangement as claimed in claim 5.

17. A data carrier with a data processing arrangement as claimed in claim 6.

18. A reading apparatus with a data processing arrangement as claimed in claim 2.

19. A reading apparatus with a data processing arrangement as claimed in claim 3.

20. A reading apparatus with a data processing arrangement as claimed in claim 4.

* * * * *